United States Patent
Erden (10) Patent No.: US 8,786,970 B2
(45) Date of Patent: Jul. 22, 2014

(54) DETERMINING INTER-TRACK COHERENCE USING OUTPUT SIGNALS FROM FIRST AND SECOND TRACKS

(75) Inventor: Mehmet Fatih Erden, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 124 days.

(21) Appl. No.: 13/429,795

(22) Filed: Mar. 26, 2012

(65) Prior Publication Data

US 2013/0250447 A1    Sep. 26, 2013

(51) Int. Cl.
    *G11B 5/09*    (2006.01)
(52) U.S. Cl.
    USPC ............... 360/45; 360/25; 360/26; 360/31; 360/39
(58) Field of Classification Search
    USPC ............. 360/31, 51, 46, 60, 69, 77.01, 77.02, 360/77.05
    See application file for complete search history.

(56) References Cited

U.S. PATENT DOCUMENTS

| | | | |
|---|---|---|---|
| 4,669,003 A | 5/1987 | Bell et al. | |
| 5,872,666 A | 2/1999 | Saiki et al. | |
| 6,031,683 A * | 2/2000 | Iverson et al. | 360/78.04 |
| 6,104,562 A | 8/2000 | Ottesen et al. | |
| 7,279,987 B1 | 10/2007 | Kaszynski | |
| 7,362,536 B1 | 4/2008 | Liu et al. | |
| 7,636,219 B2 | 12/2009 | Ikegami et al. | |
| 7,643,235 B2 | 1/2010 | Erden et al. | |
| 7,755,863 B2 | 7/2010 | Neumann et al. | |
| 2007/0146919 A1 | 6/2007 | Ohzeki et al. | |
| 2009/0142076 A1* | 6/2009 | Li et al. | 398/208 |
| 2009/0323214 A1* | 12/2009 | Grundvig et al. | 360/53 |
| 2010/0020427 A1 | 1/2010 | Mochizuki et al. | |
| 2012/0105994 A1* | 5/2012 | Bellorado et al. | 360/45 |

FOREIGN PATENT DOCUMENTS

EP    0590226 A1    4/1994

OTHER PUBLICATIONS

A. R. Krishnan, R. Radhakrishnan, B. Vasic, A. Kavcic, W. Ryan and M. F. Erden, "2-D Magnetic Recording: Read Channel Modeling and Detection," IEEE Transactions on Magnetics, pp. 3830-3836, Oct. 2009, vol. 45, Issue 10.

* cited by examiner

*Primary Examiner* — Tan X Dinh
(74) *Attorney, Agent, or Firm* — David D. Brush; Westman, Champlin & Koehler, P.A.

(57) ABSTRACT

An assembly and method to determine adjacent track coherence is disclosed. The assembly includes coherence circuitry configured to receive phase and frequency offsets from timing recovery circuitry and determine an inter-track phase and frequency coherence between the encoded data on a first track and the encoded data on a second track adjacent to the first track utilizing the frequency and phase offsets from the timing recovery circuitry for the output signals corresponding to the first and second tracks.

18 Claims, 11 Drawing Sheets

DETERMINING INTER-TRACK COHERENCE USING OUTPUT SIGNALS FROM FIRST AND SECOND TRACKS

BACKGROUND

Data storage devices store digitally encoded data on a magnetic storage media. The demand for smaller form factor devices and increased data storage provides an incentive to increase areal storage densities for the media. Two dimensional magnetic recording (TDMR) technology uses a decreased track width to increase areal storage densities. Some TDMR applications read data from adjacent tracks of the storage media using one or more read elements on a transducer head. The input signals from the adjacent tracks of the storage media are processed to decode the data on the adjacent tracks.

SUMMARY

The application discloses embodiments of an assembly and method to determine inter-track coherence between adjacent tracks using input signals from one or more read elements corresponding to data on the adjacent tracks of the storage media. The inter-track coherence determined by the assembly can be used to process output signals to decode the data on the adjacent tracks of the storage media. In illustrated embodiments, the assembly includes coherence circuitry, which is configured to use phase and frequency offsets from timing recovery circuitry for the input signals from the one or more read elements corresponding to data on the adjacent tracks to determine the inter-track coherence. In illustrated embodiments, the coherence circuitry uses a transfer function to determine inter-track phase and frequency coherence using the phase and frequency offsets for the output signals and other coherence factors such as skew angle. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
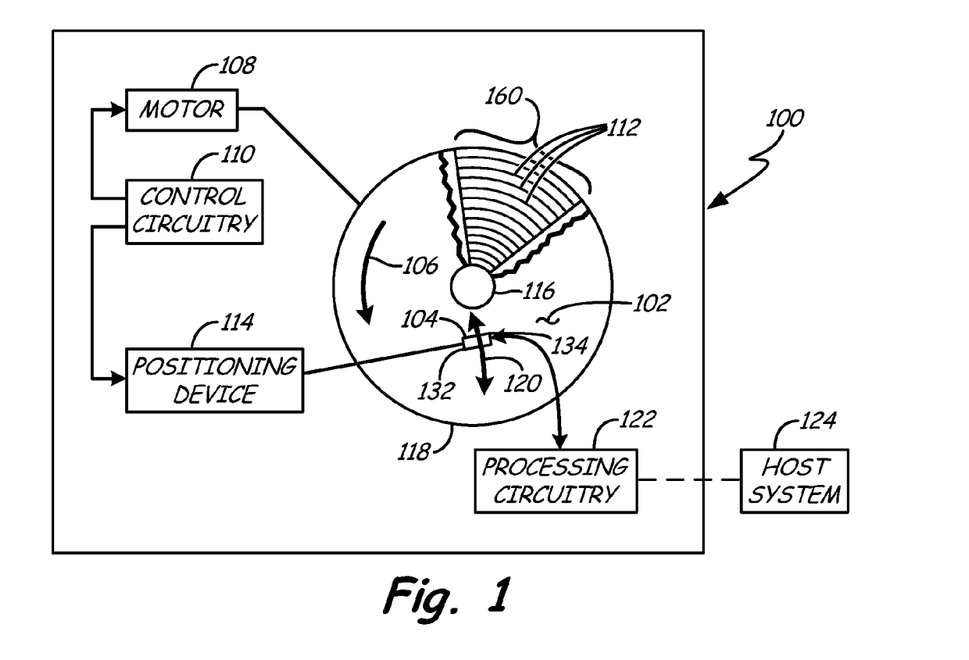
FIG. 1 is a schematic illustration of an embodiment of a data storage device including a magnetic storage media for storing magnetically encoded data.

FIG. 1 schematically illustrates a data storage device 100 in which embodiments of the present application can be implemented. As schematically shown, the device 100 includes a magnetic storage media 102 configured to store magnetically encoded data. Data is written to and read from the magnetic storage media 102 via a transducer head 104. In the illustrated embodiment, the magnetic storage media 102 is a magnetic disc rotatable about a spindle axis as illustrated by arrow 106, however application is not limited to a rotatable storage media as will be appreciated by those skilled in the art.

In the embodiment shown, the disc or media 102 is rotated or moved via a motor 108 (e.g. a spindle motor) based upon input from control circuitry 110. As the disc rotates, the head 104 reads data from or writes data to one of a plurality of concentric tracks 112 (illustrated schematically) on the media 102. As schematically shown, a positioning device 114 is coupled to the head 104 to move the head in a cross-track direction between inner and outer diameters 116, 118 of the media as illustrated by arrow 120. The positioning device 114 moves the head 104 to read data from and/or write data to select data tracks based upon input from the control circuitry 110. Input signals to the head 104 and output signals from the head 104 are processed by processing circuitry 122 to read data from and write data to the storage media 102. As schematically shown, device 100 interfaces with a host system 124, such as a computer or server device to receive input data for data storage and retrieve data from the data storage media 102.

Read and write elements of the head 104 are fabricated on a substrate or slider body as is known by those skilled in the art. The head 104 includes a leading edge 132 and a trailing edge 134. The trailing edge 134 is spaced from the leading edge 132 in a down-track direction. In the illustrated embodiment, the read and write elements are fabricated on the substrate proximate to the trailing edge 134 using thin film deposition techniques, although application is not limited to a particular fabrication technique.

The read element includes a sensor, which detects changing magnetic fields, to read the encoded data from the storage media 102. Illustrative sensors include magnetoresistive, giant magnetoresistive (GMR), tunneling magnetoresistive (TMR) or other sensors, which read the encoded data. The write element includes a main pole tip and one or more auxiliary poles. The main pole tip and the one or more auxiliary poles are magnetically connected via a yoke portion to form a magnetic flux path. A conductive coil is wound about the yoke portion to induce a magnetic flux to write the encoded data on the storage media 102 as is known by those skilled in the art.

Typically an output signal from the read element is processed by signal processing circuitry and decoded by a decoder to convert the output signal into user data bytes or bits for the host system or computer 124. Illustratively the signal processing circuitry includes a preamplifier, an automatic gain control circuit, an equalizer or filter module, data detector circuitry or other components to process the signal and detect data bits. Timing circuitry provides clock pulses to reconstruct time intervals called windows to convert the output signal into digital form. During the write process input data from the host system 124 is encoded by an encoder and converted into current pulses by a write driver to energize the conductive coil to write the data on the storage media 102.

Figure 2:
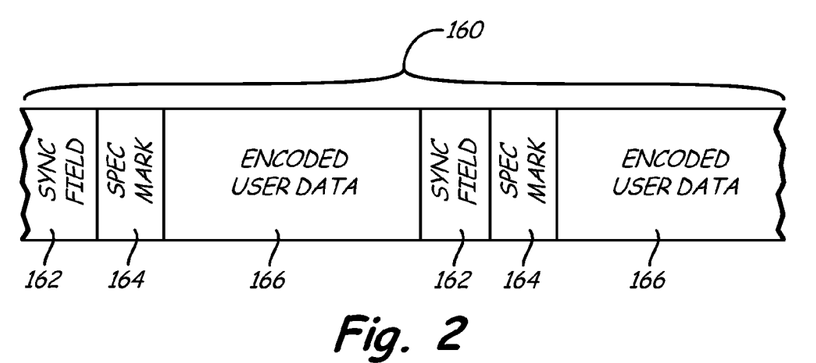
FIG. 2 is a schematic illustration of a data sector or data fields of a magnetic storage media including timing/sync data, spec mark and encoded user data.

FIG. 2 schematically illustrates a data portion or sector 160 of track 112 on the media 102. As shown, the data sector 160 includes sync or timing data 162, a spec or address mark 164 and encoded user data 166. The timing or sync data 162 includes a timing pattern, which is used to align the phase of a clock to the recorded data stream in conjunction with timing circuitry and timing recovery circuitry. Data stored on the data storage media 102 can be encoded in a perpendicular or parallel pattern. For perpendicular recording applications, the data bits are orientated in an up and down direction relative to the media 102. Perpendicular recording applications use a magnetic media having a magnetic recording layer and a soft magnetic backing layer. The magnetic flux is guided through the soft magnetic backing layer, which effectively forms a part of the write head, to induce the up and down magnetic flux pattern as is known by those skilled in the art. In some embodiments, the magnetic media has an array of magnetic islands formed by a lithographic patterning process to provide a bit patterned media (BPM) to record data bits. Application of embodiments described herein can be implemented for data on BPM. Advancements in data storage technology have increased storage density of data. Two-dimensional magnetic recording (TDMR) provides for a higher storage density by reducing a track width for the data stored on the media 102.

Figure 3A:
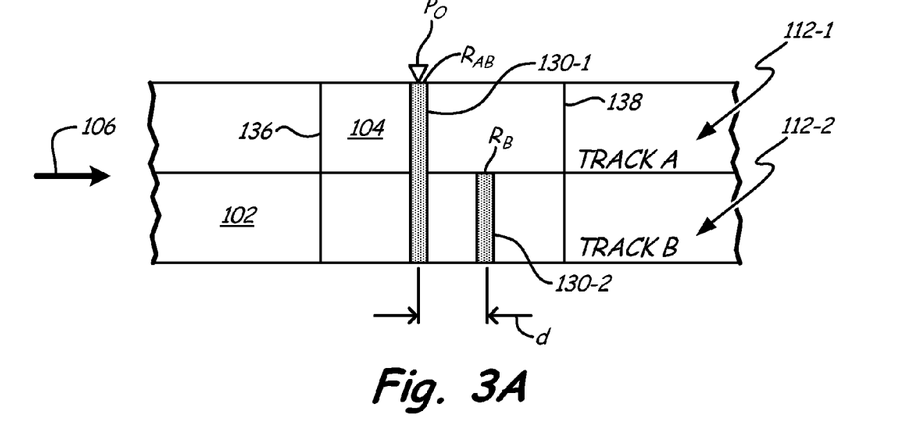
FIGS. 3A-3C schematically illustrate different embodiments of a transducer head including multiple read elements.
Figure 3B:
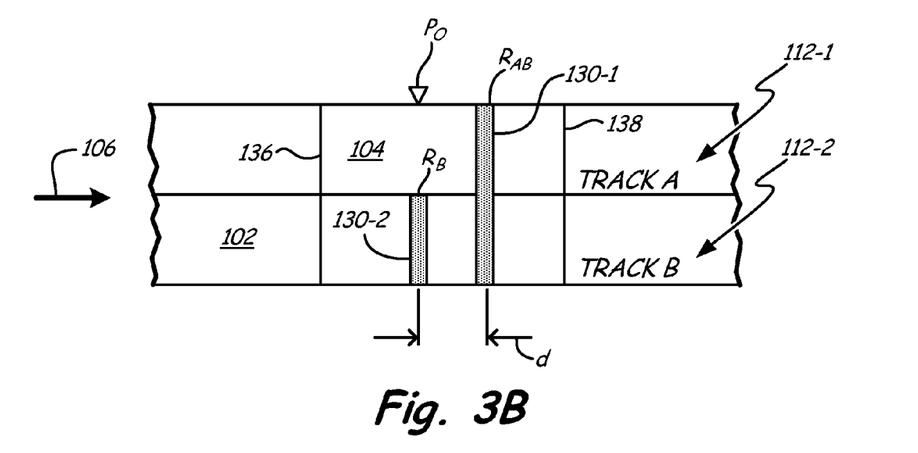
Figure 3C:
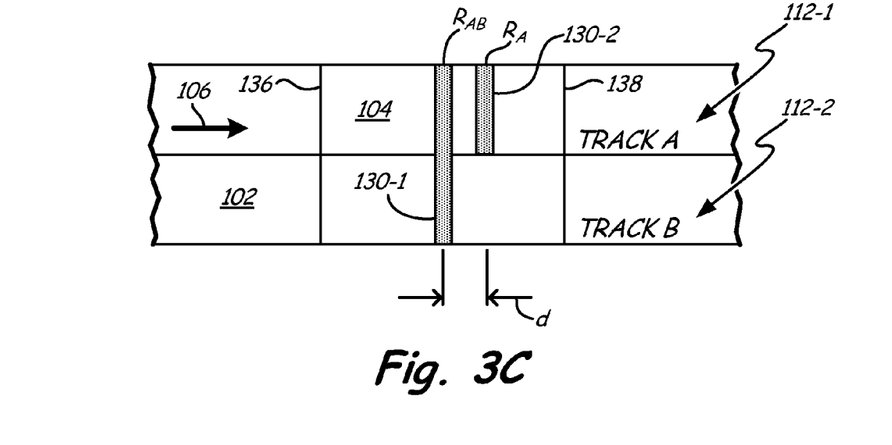

FIGS. 3A-3C schematically illustrate embodiments of heads including multiple read elements 130-$n$ (where n refers to the number of read elements). The multiple read elements 130-$n$ have application for concurrently reading data from adjacent tracks 112-1, 112-2 during a single media rotation. In the embodiment shown in FIG. 3A, the multiple read elements include a first read element $R_{AB}$ 130-1 and a second read element $R_B$ 130-2 spaced a distance—d—from the first read element $R_{AB}$ 130-1. The second read element $R_B$ 130-2 as shown is spaced down-track from the first read element $R_{AB}$ 130-1 in the direction of the trailing edge 134 of the head 104. In the illustrated embodiment, the first read element $R_{AB}$ 130-1 has a width dimension corresponding to a width dimension of adjacent tracks A and B and the second read element $R_B$ 130-2 has a width dimension corresponding to a width dimension of track B.

As the media 102 spins or moves in the direction of arrow 106, the first read element $R_{AB}$ 130-1 reads the encoded data a time $t_1$ at position $p_0$ on tracks A and B and at time $t_2$, the second read element $R_B$ 130-2 reads the encoded data from track B at position $p_0$. The difference between time $t_1$ and time $t_2$ is a function of the physical distance between read elements $R_{AB}$ 130-1 and $R_B$ 130-2 and the rotation speed of the media 102. FIGS. 3B-3C illustrate alternate embodiments for a transducer head 104 including multiple read elements 130-$n$ to concurrently read data from adjacent tracks 112-1, 112-2 in a single rotation. In the embodiment illustrated in FIG. 3B, read element $R_{AB}$ 130-1 is spaced down-track from read element $R_B$ 130-2 so that read element $R_B$ 130-2 reads the data at time $t_1$ at position $p_0$ on track B and at time $t_2$, the read element $R_{AB}$ 130-1 reads the data from tracks A and B.

FIG. 3C illustrates another embodiment of a head 104 including multiple read elements 130-$n$. The arrangement of the head illustrated in FIG. 3C is similar to FIG. 3A except that the head illustrated in FIG. 3C includes read element $R_A$ 130-2 down-track from read element $R_{AB}$ 130-1, which is configured to read data from track A spaced inwardly from track B. Although FIGS. 3A-3C illustrate a number of multiple read element arrangements, those skilled in the art, will appreciate that other arrangements can be used and application is not limited to the particular embodiments or number of read elements or adjacent tracks shown. For example, in another embodiment, the head 104 includes read element $R_A$ 130-1 that reads encoded data on track A and read element $R_B$ 130-2 that reads encoded data on track B adjacent to track A.

Figure 4:
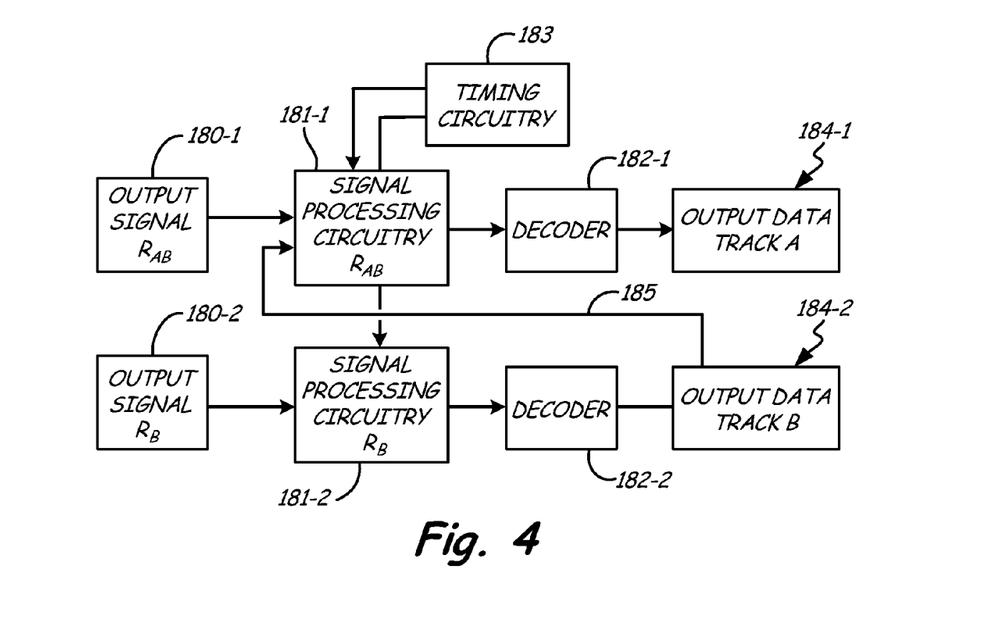
FIG. 4 schematically illustrates an example embodiment of circuit elements or components for processing and decoding data from multiple read elements on a transducer head.

As illustrated in FIG. 4, output signals 180-1, 180-2 from read elements $R_{AB}$ 130-1 and $R_B$ 130-2 (shown in FIG. 3A for example) are processed by signal processing circuitry 181-1, 181-2 and decoders 182-1, 182-2 using input from timing circuitry 183. The output signal 180-2 from read element $R_B$ 130-2 is processed and decoded to output data 184-2 stored on track B. In the illustrated embodiment, output signal 180-1 from read element $R_{AB}$ 130-1 corresponds to the encoded data on tracks A and B. As shown in FIG. 4, the output from signal processing circuit 181-2 for read element $R_B$ 130-2 is provided to the signal processing circuitry 180-1 for read element $R_{AB}$ 130-1 as illustrated by line 185 to eliminate data from track B from the output signal 180-1 from read element $R_{AB}$ 130-1 to decode and output data 184-1 stored on track A.

Figure 5:
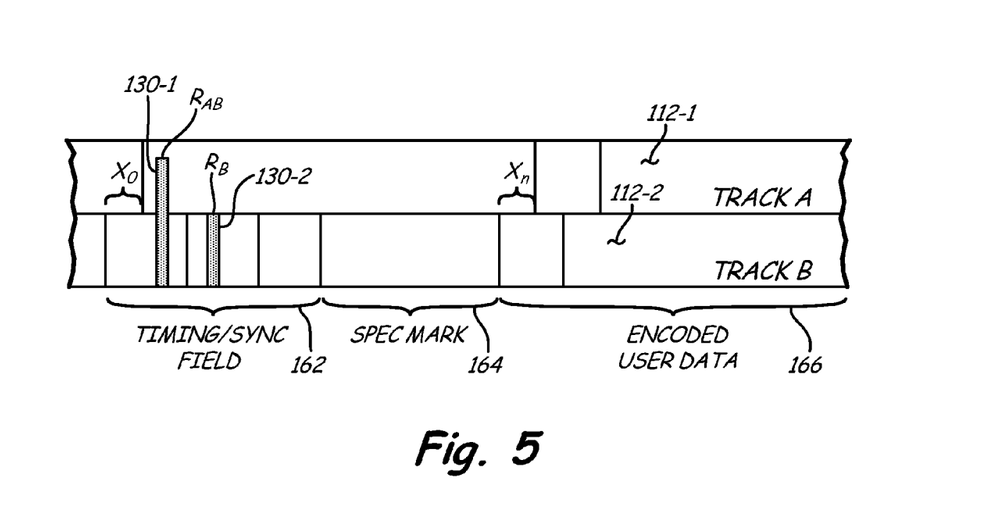
FIG. 5 schematically illustrates an embodiment of a transducer head including multiple read elements positioned relative to adjacent tracks on a magnetic storage media.

FIG. 5 schematically illustrates incoherency between data on track A and track B. The incoherence between tracks A and B in FIG. 5 includes an initial inter-track phase offset $x_0$ and inter-track offset $x_n$, at sampling instance n. In an illustrated embodiment, signal processing circuitry 181-1 uses the inter-track phase offset between track A and track B to synchronize the signals from read elements $R_{AB}$ 130-1, $R_B$ 130-2 to decode the data on track A. Processing circuitry can be configured to account for a pre-defined inter-track offset or coherence, however, variations in the spindle speed and media characteristics can alter the coherency between the adjacent tracks. Changes in the coherency between adjacent tracks can introduce timing and processing errors. To reduce timing and processing errors, the write process can be changed to reduce variations in the inter-track coherence between the data written on adjacent tracks Changes to the write process to eliminate variations in the inter-track coherence however, complicate the write process.

Figure 6A:
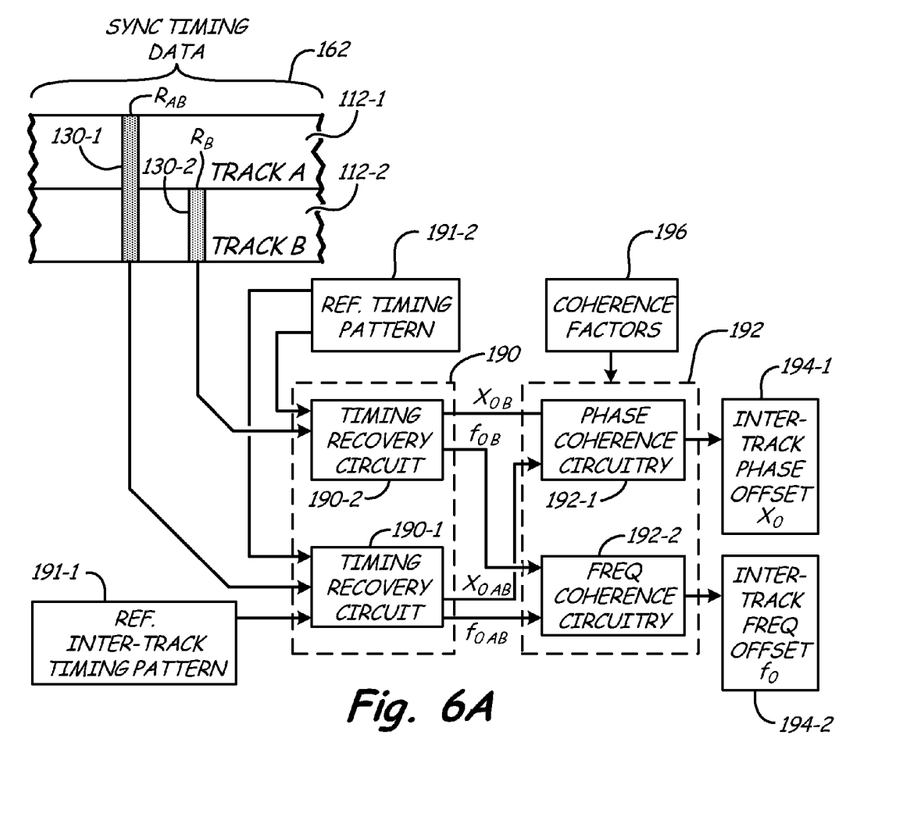
FIG. 6A illustrates an embodiment of circuit elements or components configured to determine inter-track coherence using output signals from the multiple read elements illustrated in FIG. 5.

FIG. 6A illustrates an embodiment of an assembly configured to recover inter-track phase and frequency offsets between adjacent tracks A and B using multiple read elements to reduce processing errors. The assembly illustrated in FIG. 6A uses phase and frequency offsets $x_{0AB}$, $f_{0AB}$, $x_{0B}$, $f_{0B}$ to determine inter-track coherence based upon the expression.

$$\text{Coherency} = \text{func}(x_{0B}, x_{0AB}, f_{0B}, f_{0AB})$$

where $x_{0AB}$ is an initial phase offset for read element $R_{AB}$;

$f_{0AB}$, is an initial frequency offset for read element $R_{AB}$;

$x_{0B}$, is an initial phase offset for read element $R_B$;

$f_{0B}$ is an initial frequency offset for read element $R_B$.

As shown in the assembly of FIG. 6A, the timing or sync fields on adjacent tracks 112-1, 112-2 are aligned so that read elements $R_{AB}$ 130-1 and $R_B$ 130-2 concurrently read the bit pattern from the timing fields 162 on both tracks A and B.

Output signals from the read elements $R_{AB}$ 130-1 and $R_B$ 130-2 (or other input read elements for adjacent tracks A and B) corresponding to the timing patterns are processed by the timing recovery circuitry 190-1, 190-2 as illustrated in FIG. 6A. In the illustrated embodiment, output from read element $R_B$ 130-2 is processed by timing recovery circuit 190-2 to provide the initial phase and frequency offsets $x_{OB}$ and $f_{OB}$ for the input signal relative to reference timing pattern 191-2. Output from read element $R_{AB}$ 130-1 is processed by timing recovery circuit 190-1 using reference timing pattern 191-2 and inter-track reference timing pattern 191-1 to provide the initial phase and frequency offsets $x_{OAB}$ and $f_{OAB}$ for the input signal for tracks A and B. The reference inter-track timing pattern 191-1 defines a preset offset or coherence between tracks A and B.

As schematically shown in FIG. 6A, the initial phase and frequency offsets determined from the output signals from read elements $R_{AB}$ 130-1 and $R_B$ 130-2 are provided to coherence circuitry 192, which as shown includes phase coherence circuitry 192-1 and frequency coherence circuitry 192-2. The phase coherence circuitry 192-1 is configured to process the phase offsets $x_{OB}$ and $x_{OAB}$ from the timing recovery circuitry 190-1, 190-2 and output an initial inter-track phase offset $x_0$ 194-1 for adjacent tracks A and B. The frequency coherence circuitry 192-2 is configured to process the frequency offsets $f_{OB}$ and $f_{OAB}$ from the timing recovery circuitry 190-1, 190-2 and output an initial inter-track frequency offset $f_0$ 194-2 for adjacent tracks A and B. As shown, the phase and frequency coherence circuitry 192-1, 192-2 use coherence factors 196 to determine the initial inter-track phase and frequency offsets $x_0$ and $f_0$ 194-1, 194-2 as schematically illustrated.

The functional relationship between coherence and the timing offsets for read elements $R_{AB}$ and $R_B$ can be derived using numerical analysis or numerical modeling techniques. The functional relationship between coherence and the phase and frequency offsets $x_{OB}$, $x_{OAB}$, $f_{OB}$, $f_{OAB}$ for read elements $R_{AB}$ 130-1, $R_B$ 130-2 can be provided by a transfer function or determined through a lookup table. In an illustrated embodiment, the relation between inter-track phase coherence $x_0$ and phase offsets $x_{OB}$, $x_{OAB}$, for very small frequency and phase offset values is defined by the transfer function $$x_0 = \frac{(a+b)}{b}(x_{0B} - x_{0AB})$$

where $x_0$ is an initial inter-track phase coherence or offset between tracks A and B;

$x_{OAB}$ is an initial phase offset for the output signal from read element $R_{AB}$;

$x_{OB}$, is an initial phase offset for the output signal from read element $R_B$;

a and b are coherence factors.

Similarly, the relation between inter-track frequency coherence and frequency offsets $f_{OB}$, $f_{OAB}$ for very small frequency and phase offset values is defined by the transfer function.

$$f_0 = \frac{(a+b)}{b}(f_{0b} - f_{0ab})$$

$f_0$ is an initial inter-track frequency coherence or offset between tracks A and B;

$f_{OAB}$, is an initial frequency offset for the output signal from read element $R_{AB}$;

$f_{OB}$, is an initial frequency offset for the output signal from read element $R_B$;

a and b are coherence factors.

In the expressions above, coherence factors a and b are variables that relate to skew angle. Skew angle is defined as an offset angle of the head or write element relative to a center line of the track 112. In the illustrated embodiments the multiple read elements are shown for illustrative purposes at a zero skew angle. The skew angle varies with respect to the position of the head relative to the inner or outer diameters 116, 118 of the media 102. In the illustrated embodiment, the coherence factors a and b as defined by the transfer functions vary based upon the position of the head with respect to the media 102. In the illustrated embodiment, the coherence circuitry 192 includes circuit components configured to apply the transfer functions using input from the timing recovery circuitry 190-1, 190-2.

Figure 7:
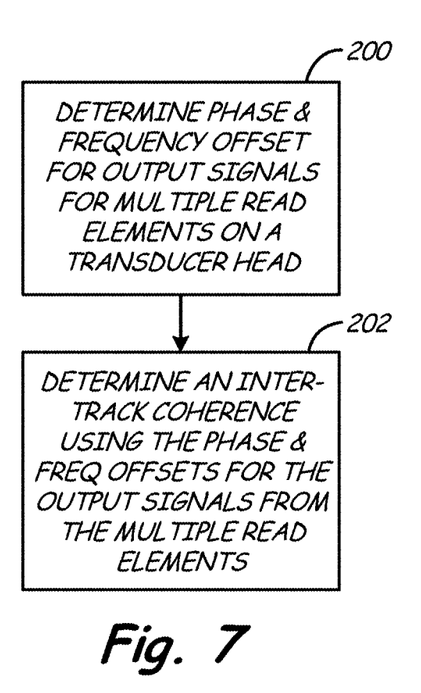
FIG. 7 is a flow chart illustrating steps for determining inter-track coherence using output signals from multiple read elements on a transducer head as illustrated in FIG. 6A.

FIG. 7 is a flow chart illustrating steps for determining phase and frequency coherence between adjacent tracks using the multiple read elements $R_{AB}$ 130-1 and $R_B$ 130-2 as previously described. As shown in step 200, the phase and frequency offsets for the multiple read elements $R_{AB}$ 130-1 and $R_B$ 130-2 are determined relative reference timing patterns 191-1, 191-2. In step 202, the inter-track phase and frequency coherence is determined based upon the phase and frequency timing offsets for the output signals from the multiple read elements $R_{AB}$ 130-1 and $R_B$ 130-2. As described, with respect to FIG. 6A, the phase and frequency coherence can be determined using multiple read elements in a single rotation, which reduces latency in the read process.

Figure 6B:
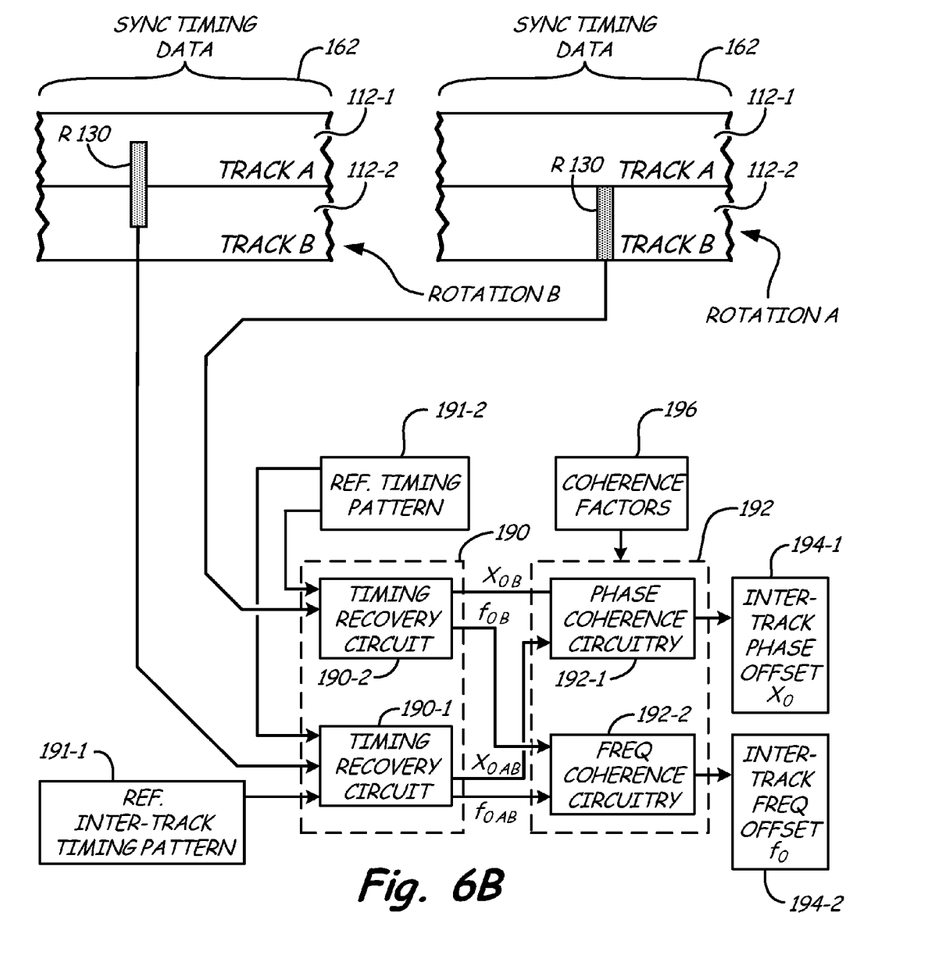
FIG. 6B illustrates an embodiment similar to FIG. 6A for determining inter-track coherence using output signals from a single read element using multiple rotations of the media.

In another embodiment illustrated in FIG. 6B the inter-track phase and frequency offsets between adjacent tracks A and B is determined using a single read element R 130 on a transducer head which is sequentially positioned relative to track B and tracks A and B during multiple rotations of the media 102. As shown in FIG. 6B, read element R 130 is positioned to read the bit pattern from the timing fields 162 on track B in one rotation a, and positioned to read the bit pattern on tracks A and B in another rotation b. Output signals from the read element R 130 corresponding to the timing patterns for track B and adjacent tracks A and B are processed by the timing recovery circuitry 190-1, 190-2 as shown in FIG. 6B.

Output from read element R 130 for track B is processed by timing recovery circuit 190-2 to provide the initial phase and frequency offsets $x_{OB}$ and $f_{OB}$ for the input signal relative to reference timing pattern 191-2 as previously described for the embodiment illustrated in FIG. 6A. Output from read element R 130 for tracks A and B is processed by timing recovery circuit 190-1 to provide the initial phase and frequency offsets $x_{OAB}$ and $f_{OAB}$ for the input signal relative to timing patterns 191-1, 191-2 as previously described for the embodiment illustrated in FIG. 6A. As schematically shown in FIG. 6B, the initial phase and frequency offsets determined from the output signals are provided to the phase and frequency coherence circuitry 192-1, 192-2 to output an initial inter-track phase offset $x_0$ 194-1 and frequency offset $f_0$ 194-2 for adjacent tracks A and B.

Figure 8:
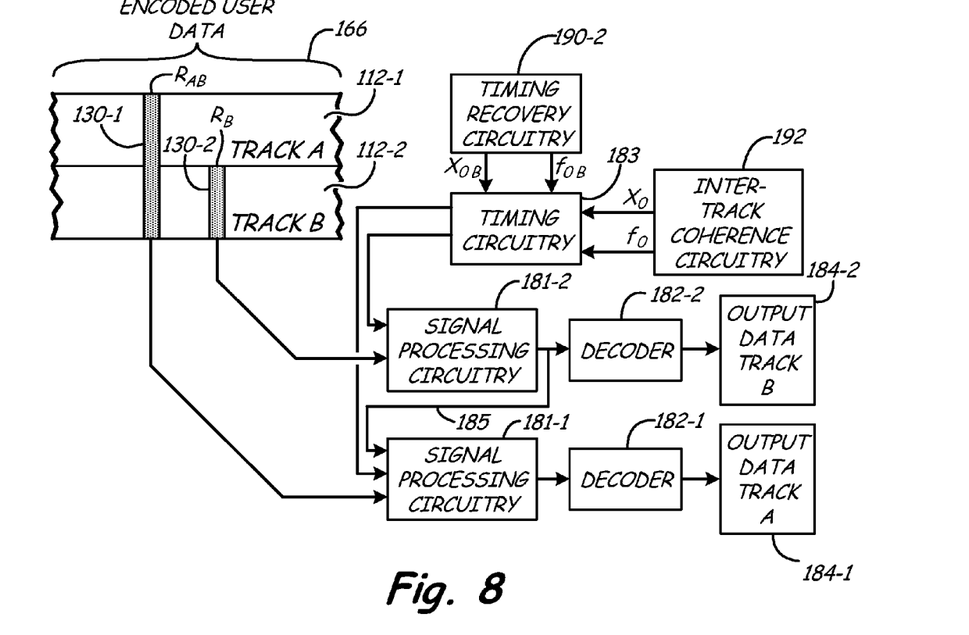
FIG. 8 illustrates an example embodiment of circuit elements or components configured to read and decode data from adjacent tracks using multiple read elements on a transducer head.

FIG. 8 is a schematic illustration of processing circuitry that utilizes inter-track phase and frequency coherence to decode the encoded user data 166. In the embodiment illustrated in FIG. 8, data from adjacent tracks A and B is read using multiple read elements $R_B$ and $R_{AB}$ as shown, however, the data from tracks B and tracks A and B can be read using a single read element R 130 as previously described with respect to FIG. 6B. As shown, the phase and frequency offsets $x_{0B}$, $f_{0B}$ for read element $R_B$ are provided to timing circuitry 183 to adjust clock pulses to process the output signal from read element $R_B$ for track B via signal processing circuitry 181-2. The inter-track phase and frequency offsets $x_0$, $f_0$, are also provided to the timing circuitry 183 to align the sampling instances for track A. Signal processing circuitry 181-1 uses timing input, $x_{0B}$, $f_{0B}$ and the inter-track offsets $x_0$, $f_0$, to process the output signal from read element $R_{AB}$. As shown the data from track B is extracted from the output signal from read element $R_{AB}$ using the output from the signal processing circuitry 181-2 for read element $R_B$ as shown by line 185 and the timing data including the inter-track coherence $x_0$, $f_0$, between tracks A and B. The inter-track offset or coherence is estimated at a sampling instance n based upon the equation.

$$x = x_0 + f_0 * n$$

where
n is the number of sampling instances;
$x_0$ is the initial inter-track phase offset;
$f_0$ is the initial inter-track frequency offset.

Figure 9:
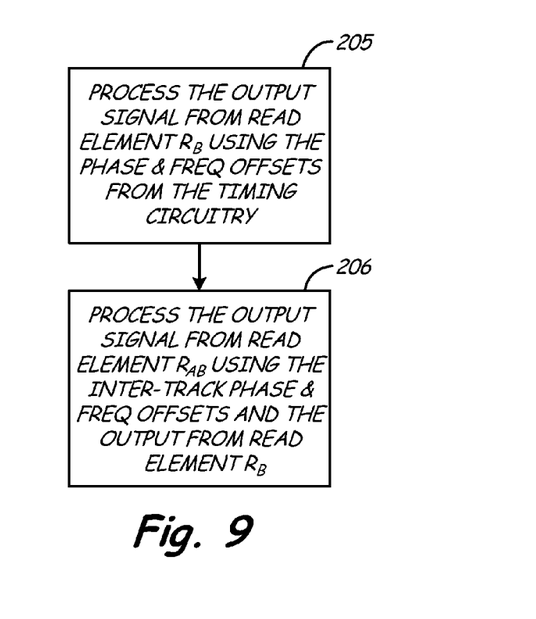
FIG. 9 is a flow chart illustrating steps for reading data from adjacent tracks using multiple read elements on a transducer head.

FIG. 9 is a flow chart illustrating steps for processing output signals from read elements $R_{AB}$ and $R_B$ to read data from adjacent tracks A and B. As shown in step 205, the output signal from read element $R_B$ 130-2 is processed using phase and frequency offsets from timing recovery circuitry 190-2 to read the data on track B. In step 206, the output signal from read element $R_{AB}$ is processed using the inter-track offset between tracks A and B and the output from the processing circuitry 181-2 for read element $R_B$. 130-2 to extract the data for track B from the output signal from read element $R_{AB}$ 130-1.

An experimental simulation was performed to confirm use of the assembly and method for determining inter-track coherence. The simulation used electronic noise to model readback signal noise for read elements $R_{AB}$ and $R_B$ simulating input from track B and tracks A and B. In the simulation, the reference inter-track offset between tracks was set to T/2 where T is a length of a bit and the reference inter-track frequency offset was set to 0.1%. The simulation used an analog front end filter (low pass filter) to filter out excessive out-of-band noise before sampling. The channel bit density (cbd) of the system was set to 2.5 (which means that 2.5 bits fit within a full-width-half-maximum of the dibit response of the system).

An analog-to-digital sampler controlled by timing recovery circuitry 148 is used to generate the digital output from the readback signals. The simulation determined the phase and frequency offsets for readback signals from read elements $R_{AB}$ and $R_B$ using input from the timing or sync fields 162. The simulation did not use equalization circuitry, channel coding or a detection algorithm to process the read signal, however, enhanced signal processing could improve simulation results.

Figure 10A:
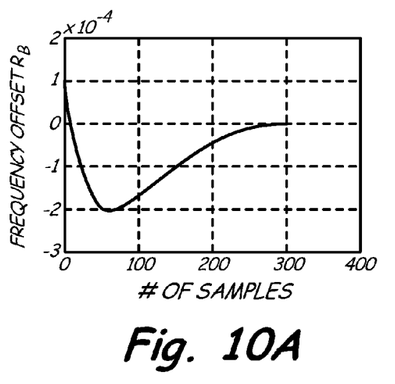
FIGS. 10A-10D graphically illustrate phase and frequency offsets for a number of simulated read signals from multiple read elements having a pre-defined coherence.
Figure 10B:
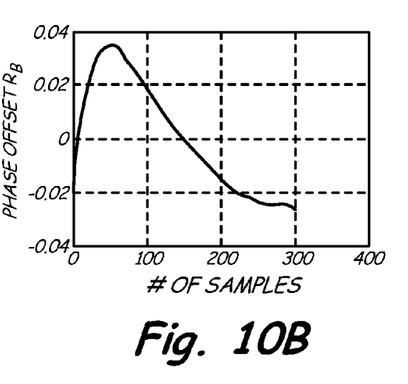
Figure 10C:
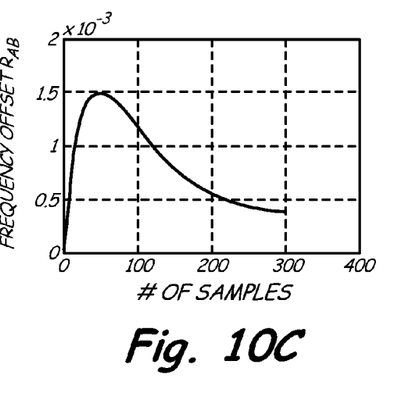
Figure 10D:
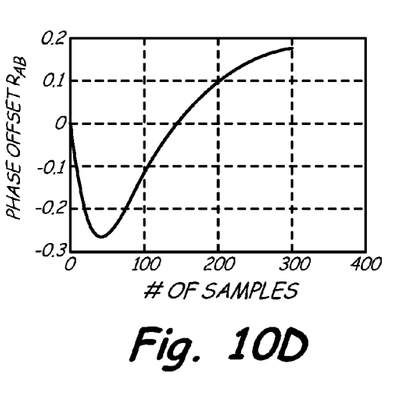

The timing recovery parameters were set so that the timing recovery circuitry could recover the phase and frequency offsets within 300 samples in the presence of a high signal-to-noise ratio (SNR). FIGS. 10A-D illustrate the recovered phase and frequency offsets for the samples for the readback signals from read elements $R_{AB}$ and $R_B$. In FIGS. 10A-B since there were not timing errors introduced for read element $R_B$, the phase and frequency offsets for read element $R_B$ was small, while the phase and frequency offsets for read element $R_{AB}$ was higher, as illustrated in FIGS. 10C-10D, because of the predefined inter-track phase and frequency offsets.

A transfer function was derived to transform the recovered phase and frequency offset data for the input signals from read elements $R_{AB}$, $R_B$ into the inter-track offsets or coherence. The transfer functions derived are.

$$x_0 = 1.05 \frac{(a+b)}{b}(x_{0b} - x_{0ab})$$

$$f_0 = 1.05 \frac{(a+b)}{b}(f_{0b} - f_{0ab})$$

The transfer functions above were scaled by 1.05 because the reference or predefined inter-track coherence in the simulation was set relatively high at T/2 wherein in use in a data storage environment, inter-track phase and frequency offsets are typically relatively small. Using the above transfer function and coherence values a=7/12 and b=5/12, the calculated inter-track phase and frequency offsets $x_0$, $f_0$, were 0.5016 T and 0.1003% which is very close to the pre-set inter-track phase and frequency offsets of T/2 and 0.1%, respectively.

Figure 11A:
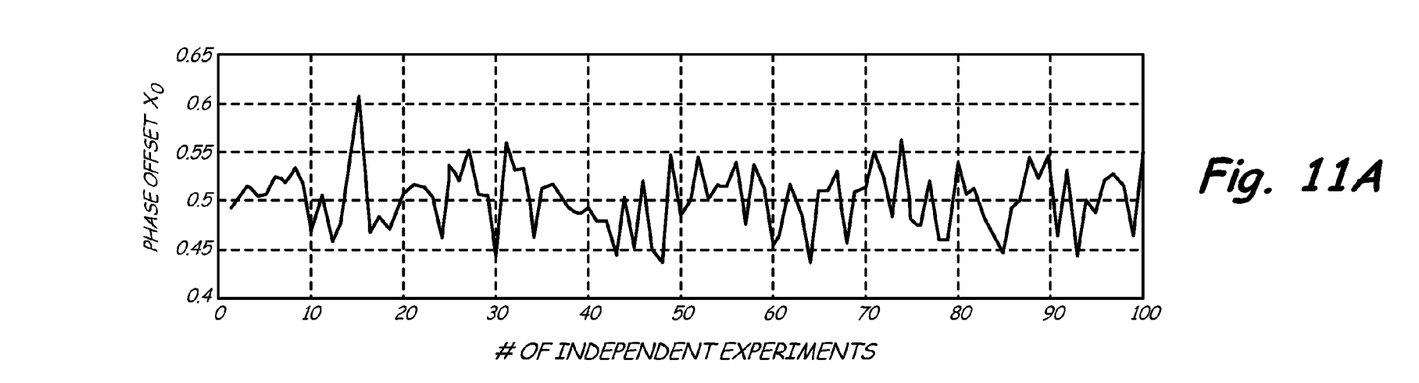
FIGS. 11A-11B graphically illustrates phase and frequency coherence between the read signals from multiple read elements determined using phase and frequency offsets for the multiple read elements for a pre-defined signal-to-noise ratio (SNR).
Figure 11B:
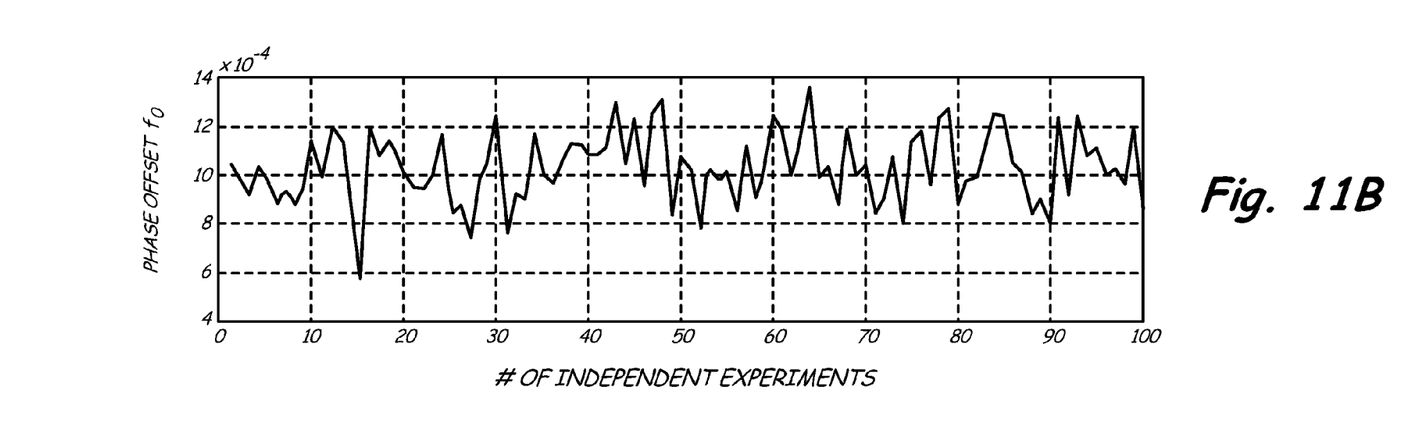

FIGS. 11A-11B illustrate phase and frequency coherence for 100 experiments using the transfer functions previously derived and a signal to noise ratio SNR 20 db lower than previously used to derive the transfer functions. The resultant mean inter-track phase offset $x_0$ is 0.4997 and the standard deviation is 0.0322. The mean and standard deviation of the frequency offset are 0.1013% and 0.014811%, respectively.

Figure 12A:
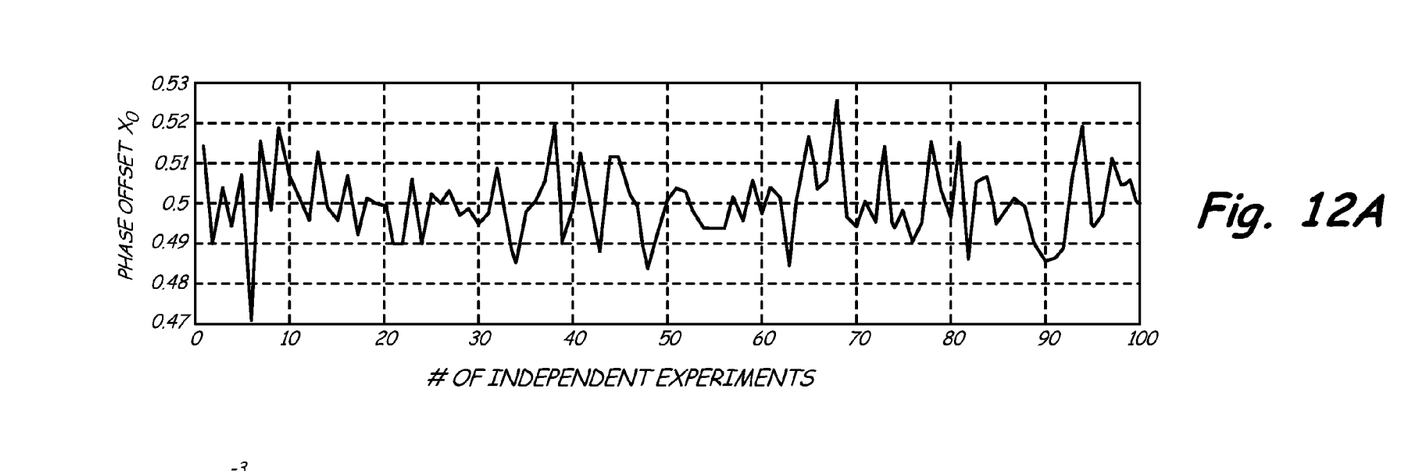
FIGS. 12A-12B graphically illustrate phase and frequency coherence between the read signals from multiple read elements determined using phase and frequency offsets for the multiple read elements for a lower SNR than the SNR used for the iterations illustrated in FIGS. 11A-11B.
Figure 12B:
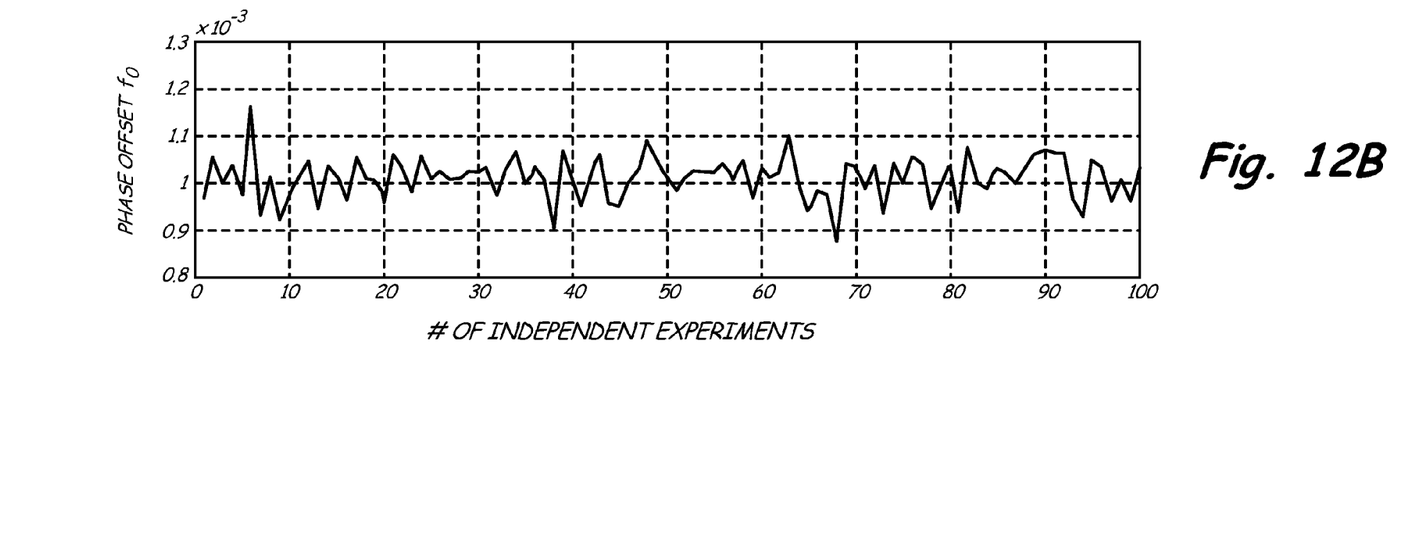

FIGS. 12A-12B illustrate inter-track phase and frequency offsets determined using the transfer function previously derived and a SNR 10 db less than the SNR used in the experimental simulation illustrated in FIGS. 11A-11B. The mean inter-track phase offset $x_0$ for the experiments illustrated in FIG. 12A is 0.5003 T and the standard deviation is 0.0093. The mean and standard deviation of the inter-track frequency offset $f_0$ are 0.10096% and 0.0044966% as illustrated in FIG. 12B. As illustrated in FIGS. 11A-11B and FIGS. 12A-12B, the inter-track coherence determined experimentally using the transfer functions are very close to the pre-defined phase and frequency offsets between adjacent tracks. Thus, the example transfer functions provide a close estimation of the inter-track coherence using feedback from the multiple read elements on a head or a single read element as described.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application, while maintaining substantially the same functionality without departing from the scope and spirit of the present invention. For instance, application is not limited to the timing or sync data within the data sectors of the media and alternate PLL or sync data from other sectors or servo sectors can be used. In addition, although illustrated embodiments describe application for a data storage device having a particular magnetic storage media, application of the present invention can be applied to other media, without departing from the scope and spirit of the present invention.

What is claimed is:

1. An assembly comprising:
   timing recovery circuitry configured to process a first signal corresponding to input from a first track utilizing a first reference pattern to provide a first phase and frequency offset for the first signal and process a second signal different from the first signal corresponding to input from the first track and a second track utilizing a second inter-track reference pattern to provide a second phase and frequency offset for the second signal; and
   coherence circuitry including circuit components configured to use the first phase and frequency offsets for first signal and the second phase and frequency offset for the second signal outputted from the timing recovery circuitry to determine an inter-track phase and frequency coherence between the first and second tracks.

2. The assembly of claim 1 and comprising a transducer head including a first read element and a second read element spaced from the first read element and the first signal is provided by the first read element and the second signal is provided by the second read element.

3. The assembly of claim 2 wherein the timing recovery circuitry is configured to process the first signal from the first read element from a timing field on the first track relative to the reference pattern and the timing recovery circuitry is configured to process the second signal from the second read element from timing fields on the first and second tracks and provide the phase and frequency offsets for the second signal relative to the second inter-track reference pattern.

4. The assembly of claim 1 wherein the circuit components of the coherence circuitry are configured to determine a differential between the phase or frequency offsets for the first and second signals and multiple the differential by a skew factor to determine the inter-track phase or frequency coherence.

5. The assembly of claim 1 wherein the circuit components of the coherence circuitry apply phase and frequency transfer functions derived numerically to determine the inter-track phase and frequency coherence based upon the phase and frequency offsets determined from the timing recovery circuitry for the first and second signals.

6. The assembly of claim 1 comprising signal processing circuitry including circuit components configured to use the inter-track phase and frequency coherence between the first and second tracks to decode user data on the first and second tracks.

7. The assembly of claim 1 wherein the circuit components of the coherence circuitry are configured to use initial inter-track phase and frequency offsets from the coherence circuitry to determine the inter-track phase coherence at a sampling instance n by multiplying the initial inter-track frequency offset by the sampling instance n and adding the initial inter-track phase offset.

8. The assembly of claim 1 wherein the coherence circuitry uses a phase transfer function to output an inter-track phase offset where the phase transfer function is provided by the equation $$x_0 = \frac{(a+b)}{b}(x_{0B} - x_{0AB})$$

where $x_0$ is an inter-track first phase offset, $X_{OB}$ is the phase offset for the first signal from a first read element $R_B$, $X_{OAB}$ is the second phase offset for the second signal from a second read element $R_{AB}$, and a and b are coherence factors.

9. The assembly of claim 1 wherein the coherence circuitry uses a frequency transfer function to output an inter-track frequency offset where the frequency transfer function is provided by the equation $$f_0 = \frac{(a+b)}{b}(f_{0B} - f_{0AB})$$

where $f_0$ is an inter-track frequency offset, $f_{OB}$ is the first frequency offset for the first signal from a first read element $R_B$, $f_{OAB}$ is the second frequency offset for the second signal from a second read element $R_{AB}$, and a and b are coherence factors.

10. An assembly comprising:
    timing recovery means for determining phase and frequency offsets for first and second signals corresponding to encoded data on first and second tracks of a data storage media utilizing a first reference pattern for the first signal and a second inter-track reference pattern for the second signal; and
    coherence means for determining inter-track phase and frequency coherence between the encoded data on the first and second tracks using the phase and frequency offsets for the first and second signals from the timing recovery means.

11. The assembly of claim 10 wherein the timing recovery means uses the first reference pattern to determine the phase and frequency offsets for the first signal from a first read element and the second inter-track reference pattern to determine the phase and frequency offsets for the second signal from a second read element.

12. The assembly of claim 10 wherein the coherence means comprises circuit components configured to apply a phase transfer function to determine an inter-track phase offset between the first and second tracks based upon the phase offsets for the first and second signals corresponding to the first and second tracks and a frequency transfer function to determine an inter-track frequency offset between the first and second tracks based upon the frequency offsets for the first and second signals corresponding to the first and second tracks.

13. A method comprising
    utilizing phase and frequency offsets determined by timing recovery circuitry for first and second signals corresponding to encoded data on first and second tracks of a data storage media to determine inter-track phase and frequency coherence including an initial inter-track phase offset and initial inter-track frequency offset between the adjacent first and second tracks of the data storage media; and
    determining an inter-track phase offset at sampling instance n by multiplying the initial inter-track offset by the sampling instance n and adding the initial inter-track phase offset.

14. The method of claim 13 wherein the first signal is provided from a first read element on a transducer head and the second signal is provided from a second read element on the transducer head and comprising the steps of receiving the first signal from the first read element and receiving the second signal from the second read element to determine the phase and frequency offsets.

15. The method of claim 13 wherein the first and second signals are provided from a single read element and comprising the step of receiving the first signal from the read element aligned with the first track during one rotation of the data storage media and receiving the second signal from the read element aligned with the first and second tracks during another rotation of the data storage media to determine the phase and frequency offsets.

16. The method of claim 13 wherein in the step of utilizing the phase and frequency offsets to determine the inter-track phase and frequency coherence comprises using a differential between the phase and frequency offsets for the second signal and the phase and frequency offsets for the first signal to determine the inter-track phase and frequency coherence.

17. The method of claim 16 wherein the first and second signals are provided from one or more read elements on a transducer head and comprising the step of:
   applying a skew factor to the differential between the phase and frequency offsets for the first and second signals to account for skew angle of the one or more read elements relative to the data storage media.

18. The method of claim 13 and comprising:
   determining the phase and frequency offsets for the first signal based upon a reference pattern for the first track; and
   determining the phase and frequency offsets for the second signal relative to an inter-track reference pattern for the first and second tracks.

* * * * *

UNITED STATES PATENT AND TRADEMARK OFFICE
CERTIFICATE OF CORRECTION

| | |
|---|---|
| PATENT NO. | : 8,786,970 B2 |
| APPLICATION NO. | : 13/429795 |
| DATED | : July 22, 2014 |
| INVENTOR(S) | : Mehmet Faith Erden |

Page 1 of 1

It is certified that error appears in the above-identified patent and that said Letters Patent is hereby corrected as shown below:

In the Claims

Column 10, Claim 13, Line 58:

Please delete "inter-track offset" and insert -- inter-track frequency offset --

Signed and Sealed this
Sixth Day of January, 2015

Michelle K. Lee
*Deputy Director of the United States Patent and Trademark Office*